United States Patent [19]

Kondo

[11] 4,315,590
[45] Feb. 16, 1982

[54] SOLDER BATH APPARATUS

[76] Inventor: Kenshi Kondo, c/o Nihon Dennetsu Keiki Kabushiki Kaisha, No. 27-1, Shimomaruko 2-chome, Ohta-ku, Tokyo, Japan

[21] Appl. No.: 104,776

[22] Filed: Dec. 18, 1979

[30] Foreign Application Priority Data

Dec. 27, 1978 [JP] Japan .......................... 53/177466[U]

[51] Int. Cl.$^3$ .............................................. B23K 3/06
[52] U.S. Cl. ...................................... 228/37; 118/429
[58] Field of Search .................. 228/37, 260; 118/400, 118/429

[56] References Cited

U.S. PATENT DOCUMENTS

| 3,037,274 | 6/1962 | Hancock | 228/37 X |
| 3,589,590 | 6/1971 | Fitzsimmons | 228/37 |
| 3,705,457 | 12/1972 | Tardoskegyi | 228/37 X |
| 3,726,465 | 4/1973 | Boynton et al. | 228/37 |

Primary Examiner—Mark Rosenbaum
Assistant Examiner—K. J. Ramsey
Attorney, Agent, or Firm—Stephen F. K. Yee

[57] ABSTRACT

A solder bath apparatus includes an outer open-ended vessel for containing molten solder and an inner open-ended vessel provided inside the outer vessel and adapted for forming thereon an overflowing layer of molten solder. A conduit member is connected at one end thereof to the bottom portion of the inner vessel and opens at the other end into the outer vessel. A feeding member, preferably, a rotating propeller, is provided in the conduit member for continuously feeding molten solder from the outer vessel to the inner vessel. A plate member is located in the upper portion of the inner vessel and has an opening along one side of the inner vessel to let the molten solder coming from the conduit to the inner vessel flow out only through the opening so that the overflowing layer is formed on the plate member and runs mainly in the direction away from the one side wall and toward the opposite side wall thereof.

5 Claims, 5 Drawing Figures

F I G. 5
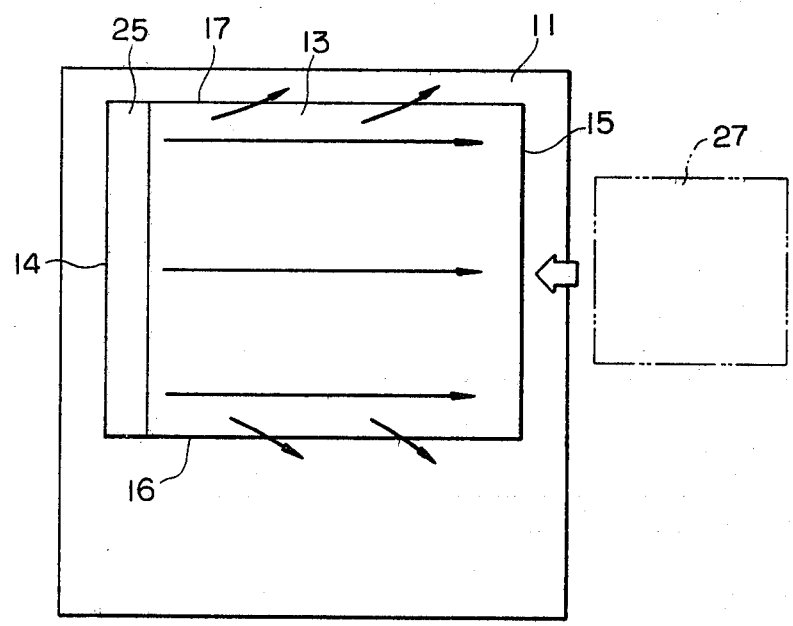

SOLDER BATH APPARATUS

BACKGROUND OF THE INVENTION

This invention relates to a solder bath apparatus and, more particularly, to a solder bath apparatus adapted to form an overflow layer of molten solder in which an article to be soldered is dipped.

It is known in the art to use the so-called flow-dip type solder bath having an inner vessel provided within an outer vessel which contains molten solder. The molten solder within the outer vessel is fed to the inner vessel by a pump or other suitable means to form an overflow layer of molten solder over the inner vessel. An article to be soldered, like a printed circuit board, is dipped in the overflow layer to effect the necessary soldering.

FIG. 1 of the accompanying drawings shows one example of the conventional flow-dip type solder bath as mentioned above, in which the reference numerals 1 and 2 denote the outer and inner vessels, respectively. Connected to the bottom of the inner vessel 2 is one end of a conduit 4 which is provided with an opening 7 at the other end thereof. A rotating propeller 5 which is driven by a motor 6 is provided within the conduit 4 at a position over the aforementioned opening 7.

As the propeller 5 is rotated by the motor 6, the molten solder within the outer vessel 1 is sucked into the conduit 4 and fed into the inner vessel 2, the molten solder being caused to overflow through an upper opening 3 of the inner vessel 2 in the radial directions as shown in FIG. 2 to return to the outer vessel 1.

An article to be soldered, for instance a printed circuit board 8, is dipped in the overflowing layer of the melt to effect the necessary soldering treatment. In this case, the overflowing layer of the melt runs in the radial directions as shown in FIG. 2, so that it becomes difficult to effect satisfactory soldering due to stagnation of solder oxides, formed by contact with air, in the center portion S. In a case where the printed circuit board 8 is dipped in the overflowing layer while being continuously moved in the horizontal direction, the soldering effect differs from one to the other part of the board since the flow of the melt is not unidirectional. In addition, when the printed circuit plate is removed from the soldering plane, unnecessary solder tends to remain on the printed circuit board.

SUMMARY OF THE INVENTION

Therefore, the present invention has as its object the provision of a solder bath apparatus which can eliminate the abovementioned drawbacks or problems inherent to the prior art devices.

It is another object of the present invention to provide a solder bath apparatus which can effect necessary soldering on printed circuit boards which are in continuous movement.

It is a further object of the present invention to provide a solder bath which is free from stagnation of solder oxides.

According to the present invention, there is provided an improved solder bath apparatus which includes an outer open-ended vessel for containing molten solder, an inner open-ended vessel located inside the outer vessel, a conduit member having one end thereof connected to the bottom portion of the inner vessel and bearing at the other end a supply port opening into the outer vessel, and a feeding member provided in the conduit member for continuously feeding molten solder from the outer vessel to the inner vessel through the supply port and the conduit member. The improvement involves a plate member located in the upper portion of the inner vessel for preventing outflow of molten solder, and an opening provided in the plate member along one side of the inner vessel to let the molten solder coming from the conduit to the inner vessel flow out only through the opening to form on the plate member an overflowing layer of the molten solder running mainly in the direction away from one side wall and toward the opposite side wall thereof.

BRIEF DESCRIPTION OF THE DRAWINGS

Other objects, features and advantages of the present invention will become apparent from the detailed description of the preferred embodiment which follows, when considered in light of the accompanying drawings, in which:

FIG. 5 is a diagrammatic plan view showing the direction of solder flow in the solder bath of FIG. 3.

DETAILED DESCRIPTION OF THE PREFERRED EMBODIMENT

Figure 1:
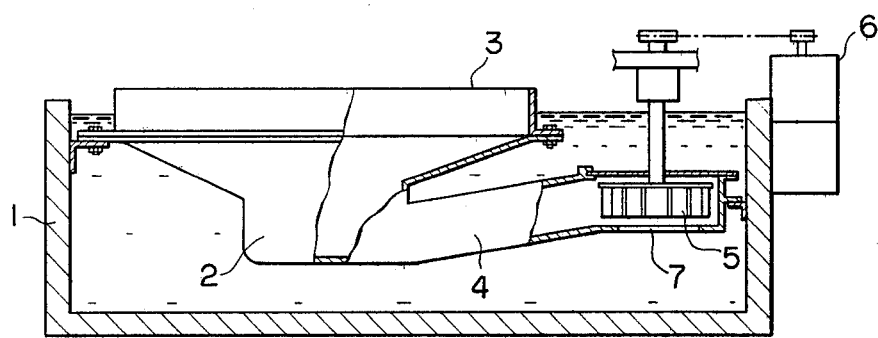
FIG. 1 is a partly cutaway side elevational view diagrammatically showing a conventional solder bath apparatus.
Figure 2:
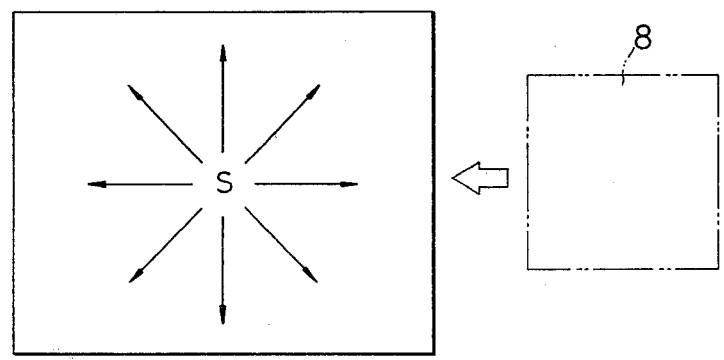
FIG. 2 is a diagrammatic plan view explanatory of the directions of solder flow in the solder bath of FIG. 1.
Figure 3:
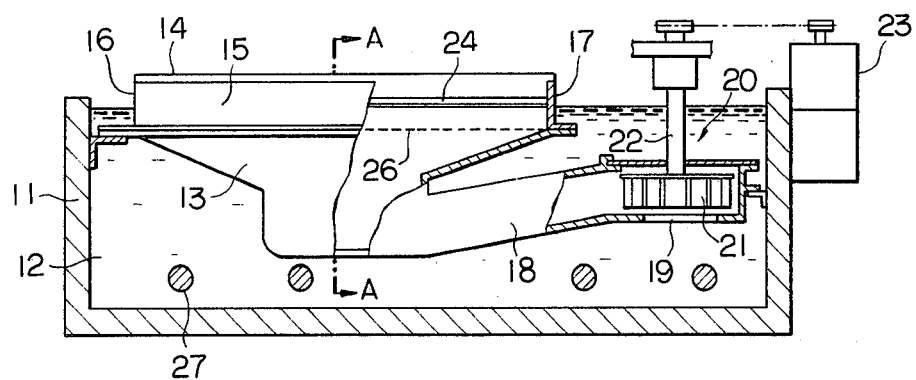
FIG. 3 is a view similar to FIG. 1 but showing a solder bath apparatus according to the present invention.

Referring to FIG. 3, the solder bath apparatus embodying the present invention includes an open-topped outer vessel 11 containing molten solder or melt 12 and an inner vessel 13 located within the outer vessel 11. The melt 12 is maintained at the desired temperature by heating elements 27, which are disposed in the outer vessel 11 and are shown only diagrammatically.

The inner vessel 13 has generally a rectangular opening at its top, which is defined by two pairs of parallel, opposed side walls 14 and 15, and 16 and 17. The upper ends of the side walls 14 to 17 are positioned above and parallel with the surface of the molten solder 12 in the outer vessel 11. The upper ends of the side walls 15 to 17 terminate at the same level and are lower than the upper end of the side wall 14. An overflowing layer of molten solder is formed over the top opening of the inner vessel 13 as will be described hereinafter.

One end of a conduit member 18 is connected to a bottom portion of the inner vessel 13, the conduit member 18 having at the other end a molten solder supply port 19 which opens toward the bottom of the outer vessel 13. Thus, the inner vessel 13 is in fluid communication with the outer vessel 11 through the conduit member 18 and its supply port 19.

Means 20 is provided in the conduit member 18 for continuously feeding the molten solder 12 in the outer vessel 11 to the inner vessel 13. The feeding means 20 is preferably a rotating propeller 21 which is located at the inlet port 19. The propeller member 21 has its shaft 22 connected to a drive means including a motor 23 so that, by the revolution of the motor 23, the propeller member 21 is rotated about the shaft 22 to continuously feed the molten solder into the inner vessel 13 from the outer vessel 11 through the conduit member 18.

A plate member 24 is horizontally located to extend along the entire lengths of the side walls 14 to 17, at a level slightly lower than the upper ends of the side walls 14 to 17 which form the upper portion of the inner vessel 13. The plate member 24 is provided with an opening 25 at its end which meets the side wall 14. Thus, the molten solder which has been admitted into the inner vessel 13 through the conduit member 18 is caused to flow over the plate member 24 through the opening 25.

Figure 4:
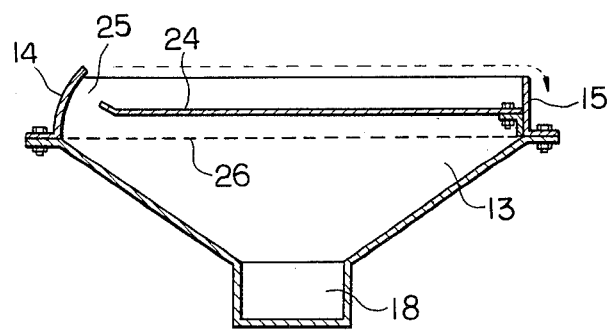
FIG. 4 is a cross-sectional elevational view taken on line A—A of FIG. 3.

The opening 25 of the plate member 24 may be formed by a number of perforations arranged in a row along the width of the side wall 14. Alternatively, a gap space may be provided between the plate member 24 and the side wall 14 as shown in FIG. 4.

Thus, the molten solder which has been forcibly introduced into the inner vessel 13 is allowed to flow over the plate member 24 through the opening 25 and fall over the side walls 15 to 17 which are lower than the side wall 14, and returns within the outer vessel 11. Since the opening 25 is provided widthwise of the side wall 14, the overflowing layer of the molten solder which is formed on the inner vessel 13 runs mainly in the direction away from the side wall 14 toward the opposing side wall 15. In order to encourage the flow of the overflowing layer from the side wall 14 toward the side wall 15, it is preferred that the side wall 14 be bent toward the side wall 15 as shown particularly in FIG. 4. It is also preferred to provide a control plate 26 with a multitude of uniformly distributed perforations beneath the plate member 24 for controlling the uniform flow of molten solder within the inner vessel 13.

In the solder bath apparatus according to the present invention, the overflowing layer of the solder over the inner vessel 13 may be held in a constant flow without allowing stagnation of solder oxides. Further, upon conveying the printed circuit board 27 counter to the main flow direction of the overflowing solder layer as shown in FIG. 5, the soldering surface of the printed circuit board 27 undergoes uniform soldering treatment, removing fins, bridges or other defects by virtue of the mutual drawing action of the printed circuit board and the overflowing solder layer.

What is claimed is:

1. A solder bath apparatus, comprising:
   an outer, open-topped vessel for containing molten solder;
   an inner, open-topped vessel located within said outer vessel;
   a conduit member having one end connected to a bottom portion of said inner vessel and bearing at the other end a solder supply port opening into the outer vessel;
   means provided within said conduit member for continuously feeding molten solder from said outer vessel to said inner vessel through said solder supply port and said conduit member;
   an imperforate plate member positioned substantially horizontally adjacent to an upper portion of said inner vessel and cooperating with the sidewalls of said inner vessel to control outflow of said molten solder from the inner vessel;
   an opening provided adjacent one edge of said plate member and along one sidewall of said inner vessel such that the molten solder can flow out from said inner vessel only through said opening and forms on the exterior surface of said plate member a solder layer flowing substantially in the direction away from said one sidewall towards the opposite sidewall.

2. A solder bath apparatus as set forth in claim 1, wherein said one sidewall extends above the exterior surface of said plate member and is inwardly curved to direct the solder flow in said direction.

3. A solder bath apparatus as set forth in claim 1, further comprising a perforated control plate located below said plate member to control the uniform upward flow of solder in said inner vessel.

4. A solder bath apparatus as set forth in claim 1, wherein said opening comprises a plurality of apertures in said plate member and the edges of said plate member contact the sidewalls of said inner vessel to restrict the flow of solder only through said apertures.

5. A solder bath apparatus as set forth in claim 1, wherein said opening comprises an elongated gap adjacent said one sidewall provided by positioning a lateral edge of said plate member spaced away from said one sidewall, the remaining edges of said plate member contacting the remaining sidewalls of said inner vessel to restrict the flow of solder only through said gap.

* * * * *